United States Patent
Narasimhan et al.

(10) Patent No.: US 6,597,688 B2
(45) Date of Patent: *Jul. 22, 2003

(54) SCALABLE ARCHITECTURE FOR TRANSMISSION OF MESSAGES OVER A NETWORK

(75) Inventors: Anand Narasimhan, Beverly Hills, CA (US); Yaacov Shemesh, Los Angeles, CA (US); Amit Kumar, Los Angeles, CA (US)

(73) Assignee: j2 Global Communications, Inc., Hollywood, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,307

(22) Filed: Jun. 12, 1998

(65) Prior Publication Data

US 2002/0181496 A1 Dec. 5, 2002

(51) Int. Cl.[7] .............................................. H04L 12/56
(52) U.S. Cl. ...................... 370/353; 370/465; 370/355; 370/356; 379/220.01
(58) Field of Search ................................ 370/237, 242, 370/252, 352, 353, 360, 389, 401, 465; 379/112, 114, 200, 220; 709/206, 228

(56) References Cited

U.S. PATENT DOCUMENTS

| | | | |
|---|---|---|---|
| 4,941,170 A | | 7/1990 | Herbst |
| 5,193,110 A | | 3/1993 | Jones et al. |
| 5,339,156 A | | 8/1994 | Ishii |
| 5,406,557 A | * | 4/1995 | Baudoin ...................... 370/61 |
| 5,487,100 A | | 1/1996 | Kane |
| 5,604,788 A | | 2/1997 | Tett |
| 5,608,786 A | | 3/1997 | Gordon |
| 5,675,507 A | | 10/1997 | Bobo, II |
| 5,712,907 A | | 1/1998 | Wegner et al. |
| 5,740,231 A | | 4/1998 | Cohn et al. |
| 5,742,668 A | | 4/1998 | Pepe et al. |
| 5,742,905 A | | 4/1998 | Pepe et al. |
| 5,758,088 A | | 5/1998 | Bezaire et al. |
| 5,765,033 A | | 6/1998 | Miloslavsky |
| 5,812,786 A | * | 9/1998 | Seazholtz et al. ...... 395/200.63 |
| 5,870,454 A | | 2/1999 | Dahlen |
| 5,999,594 A | | 12/1999 | Mizoguchi et al. |
| 5,999,965 A | * | 12/1999 | Kelly .......................... 709/202 |
| 6,025,931 A | | 2/2000 | Bloomfield |
| 6,073,165 A | * | 6/2000 | Narasimhan et al. ....... 709/206 |
| 6,208,638 B1 | * | 3/2001 | Rieley et al. ................ 370/354 |
| 6,215,858 B1 | | 4/2001 | Bartholomew et al. |
| 6,246,983 B1 | | 6/2001 | Zou et al. |
| 6,259,533 B1 | | 7/2001 | Toyoda et al. |
| 6,263,064 B1 | | 7/2001 | O'Neal et al. |
| 6,330,079 B1 | | 12/2001 | Dugan et al. |
| 6,339,591 B1 | | 1/2002 | Migimatsu |
| 6,341,160 B2 | | 1/2002 | Tverskoy et al. |
| 6,356,356 B1 | | 3/2002 | Miller, Jr. et al. |

OTHER PUBLICATIONS

L. Orozco–Barbosa, D. Makrakis, C.H. Yang, and N.D. Georganas, Design and performance evaluation of intelligent multimedia services, Computer Communications 20 (1997) pp. 219–232.*

* cited by examiner

*Primary Examiner*—Hassan Kizou
*Assistant Examiner*—Thai Hoang
(74) *Attorney, Agent, or Firm*—Blakely Sokoloff Taylor & Zafman

(57) ABSTRACT

A system for supporting a message delivery service, a method for supporting such a service and a machine accessible medium containing program data for implementing such a system. A number of processing servers are coupled to communicate with a number of outbound resources and a database server over an internal packet-switched data network. The database server contains account information on customers of the service. Request messages received from a customer over an external packet-switched data network are stored in a queue of a processing server. A router filter obtains a request message from the queue and validates a customer associated with the request message, after accessing the database server. A determination is made as to which of the multiple outbound resources to assign the request message. Each of these resources is capable of converting an input request message into a format capable of being received by a fax machine over a telephone network.

27 Claims, 8 Drawing Sheets

SCALABLE ARCHITECTURE FOR TRANSMISSION OF MESSAGES OVER A NETWORK

BACKGROUND OF THE INVENTION

The present invention relates to the field of message receipt/transmission and delivery using computer, phone, wireless and other communications networks. Specifically, the present invention relates to the transmission of e-mail messages which may be text only, text plus an audio file, text plus a video file, text plus a fax file or any combination thereof to a phone, pager or fax machine or other receiving device suitable for the message content, over appropriate communications networks using an architecture which enables easy expansion to handle additional message traffic as well as to connect to additional communications networks, including networks which do not presently exist which may become available in the future.

DESCRIPTION OF RELATED ART

Voice and data communications systems such as the public switched telephone network (PSTN) are currently used to transfer image and text data transmitted by facsimile ("fax") machines in addition to the normally carried voice traffic. These faxed images are usually transmitted through the PSTN and received for printout or storage of the image on a destination fax machine or computer for the use by the recipient.

In U.S. Pat. No. 6,208,638 entitled Method and Apparatus for Transmission and Retrieval of Facsimile and Audio Messages Over a Circuit or Packet Switched Network, it is disclosed that to provide for the receipt and transmission of audio and fax information by a first user over a circuit switched network such as the public switched telephone network (PSTN) to a second user over a packet switched network such as the Internet, a communications server is connected both to the circuit switched network and a packet switched network.

The communications server contains resources to receive and process incoming audio and facsimile calls from the circuit switched network into a format suitable for transmission over the packet switched network to the second user's address. In addition, a link is first determined between the second user's address on the circuit switched network and the second user's address on the packet switched network, and then an appropriate route to the second user's address on the packet network is determined. With the system being maintained in a distributed and redundant fashion, reliable receipt and transfer of all messages is ensured.

However, the architecture utilized as described in U.S. Pat. No. 6,208,638 is not easily scalable to handle increasingly higher levels of message traffic or to easily connect to networks in addition to the PSTN and the Internet. FIG. 1 shows the essence of the architecture of U.S. Pat. No. 6,208,638. An e-mail message is passed to an outbound resource 11 (communications server 550 in U.S. Pat. No. 6,208,638) which converts the e-mail message to a fax format or to audio for transmission to a fax machine or telephone connected to the PSTN. A database 13 stores customer information necessary for processing of messages (an unnumbered part of communications server 150 in U.S. Pat. No. 6,208,638 which is also contained in database server 195 in U.S. Pat. No. 6,208,638). After processing of an e-mail message by outbound resource 11, a fax or voice mail message is sent over the PSTN or more generally, a generalized switched telephone network (GSTN) which includes cellular telephone networks as well as the PSTN. Optionally, a pager message may also be sent informing a user of the fax which has been sent or availability of a voice mail message as described in U.S. Pat. No. 6,073,165 entitled Processing and Forwarding Messages From a Computer Network to a Forwarding Service.

SUMMARY OF THE INVENTION

A system for supporting a message delivery service is described that has a highly scalable architecture. Multiple processing servers are each coupled to communicate with multiple outbound resources and with a database server over an internal packet-switched data network. The database server contains account information on customers of the service. Request messages received from a customer over an external packet-switched data network (such as the Internet) are stored in a queue. The queue is polled for pending requests and a request message is obtained therefrom. A customer associated with this obtained request message is validated after accessing the account information in the database server. An outbound resource is assigned to this request message, where each of these resources is capable of converting an input request message into a format capable of being received by a fax machine over a telephone network.

DETAILED DESCRIPTION OF THE INVENTION

The present invention provides a method and apparatus for allowing the receipt and transmission of audio, video and fax information between a circuit switched network and a packet switched network. For purposes of explanation, specific embodiments are set forth to provide a thorough understanding of the present invention. However, it will be understood by one skilled in the art, that the invention may be practiced without these details. Further, although the present invention is described through the use of circuit switched and packet switched networks, most, if not all, aspects of the invention apply to all networks in general. Moreover, well-known elements, devices, process steps and the like are not set forth in detail in order to avoid obscuring the present invention.

Figure 1:
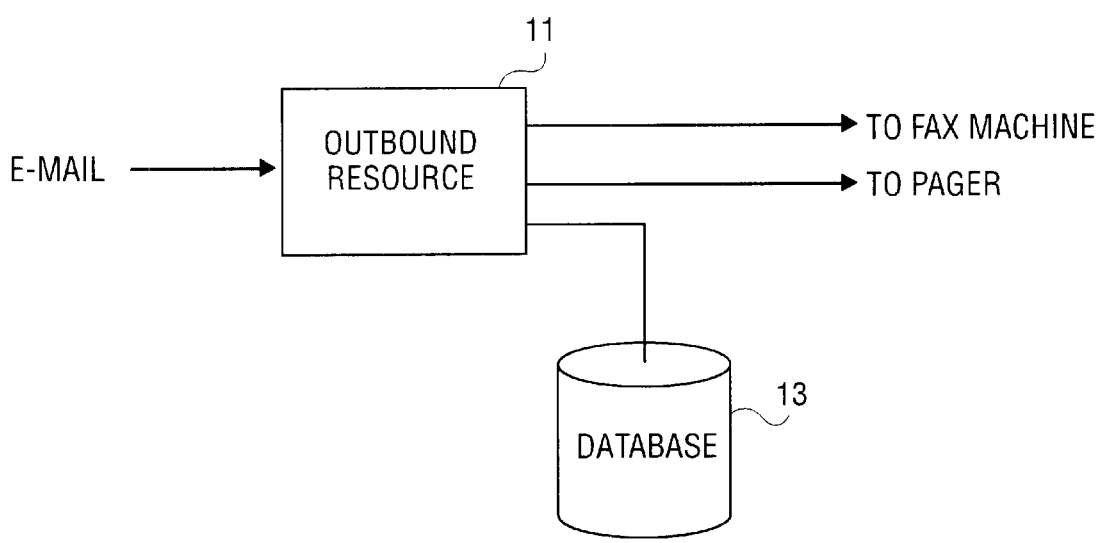
FIG. 1 is a block diagram of a prior art architecture which performs the functions, but not the scalability of the architecture of the present invention.
Figure 2:
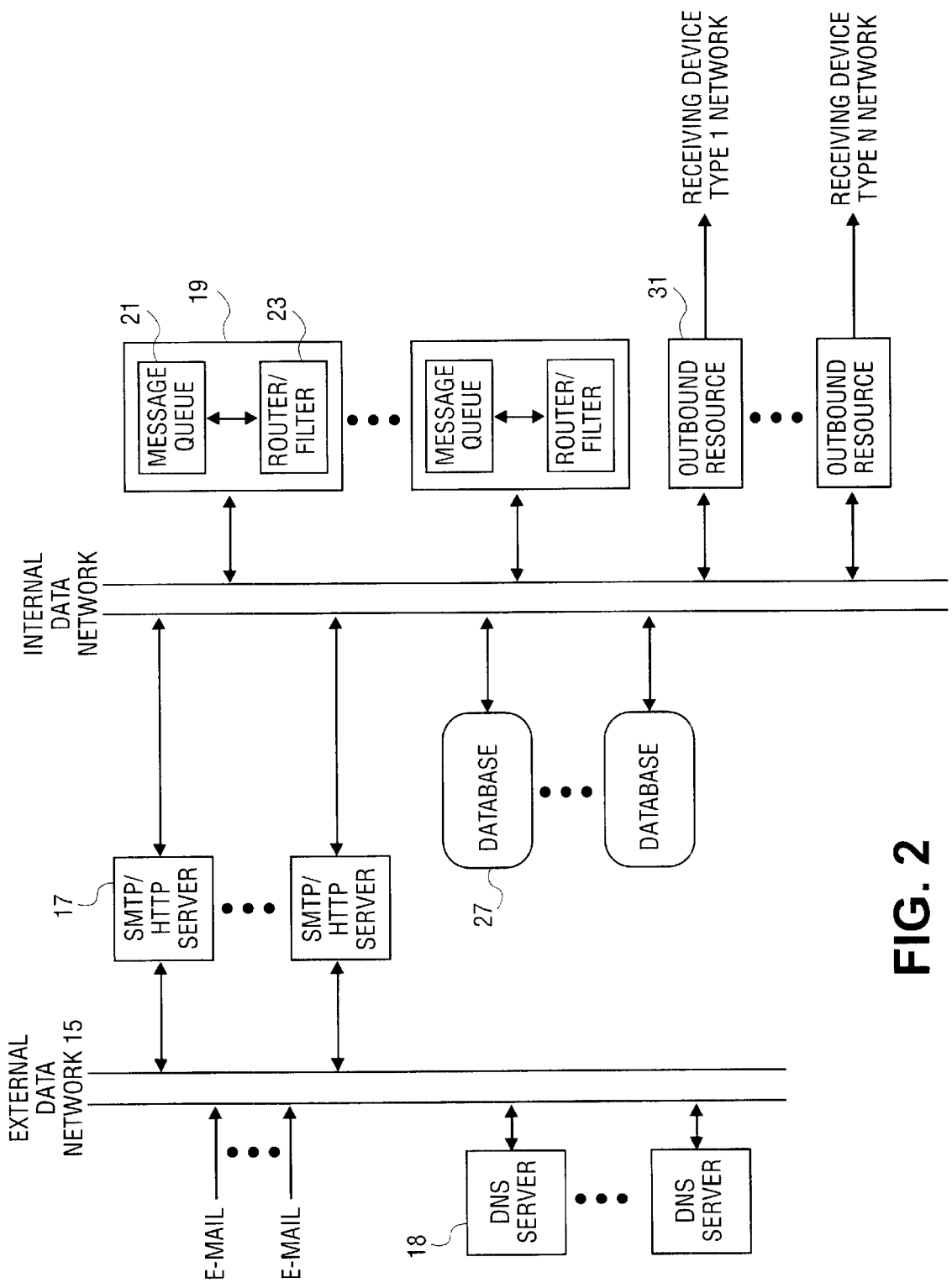
FIG. 2 is a block diagram illustrating the architecture of the present invention.

Referring now to FIG. 2, e-mail messages for a customer are sent to/through an external data network 15 (e.g., the Internet) and routed to an appropriate SMTP/HTTP (or SHTTP) server 17 as determined by a domain name server (DNS) 18 according to well known techniques. The e-mail message may be a text message or it may include a file, the content of which may be audio, video or bitmapped (e.g., a fax) or other data. Again, the techniques for creating and sending e-mail messages with these characteristics are well known.

A processing server 19, which includes a message queue 21 and a router/filter 23 first verifies that the message is from or is to a customer using information in database 27. After successful verification, the message is broken into fragments (in the case of files with multiple attachments) and written to message queue 21. Router/filter 23 obtains messages from the message queue and handles least call routing/billing/prioritization/filtering of messages. Filtering is primarily for notification messages for pager delivery. After billing verification and determination of a least cost route, the message is assigned to one or more outbound resources 31 for delivery to the intended recipient by a method or methods selected by the customer as previously recorded in database 27.

In the case of faxes, the outbound resource is a server which dials the destination fax number and sends the fax.

In the case of voice messages, the outbound resource is a server which dials the destination telephone number and plays the voice message.

In the case of notification messages, the outbound resource is a server which dials out to the paging terminal or delivers the notification message through any appropriate paging gateway.

After the message (in whatever form) has been delivered, a receipt with details and an error log (if any) is sent back via a secure protocol to the message queue 21.

The receipt/error log messages are then processed by the router/filter which interfaces with a billing system (not shown) for customer account update.

Figure 3:
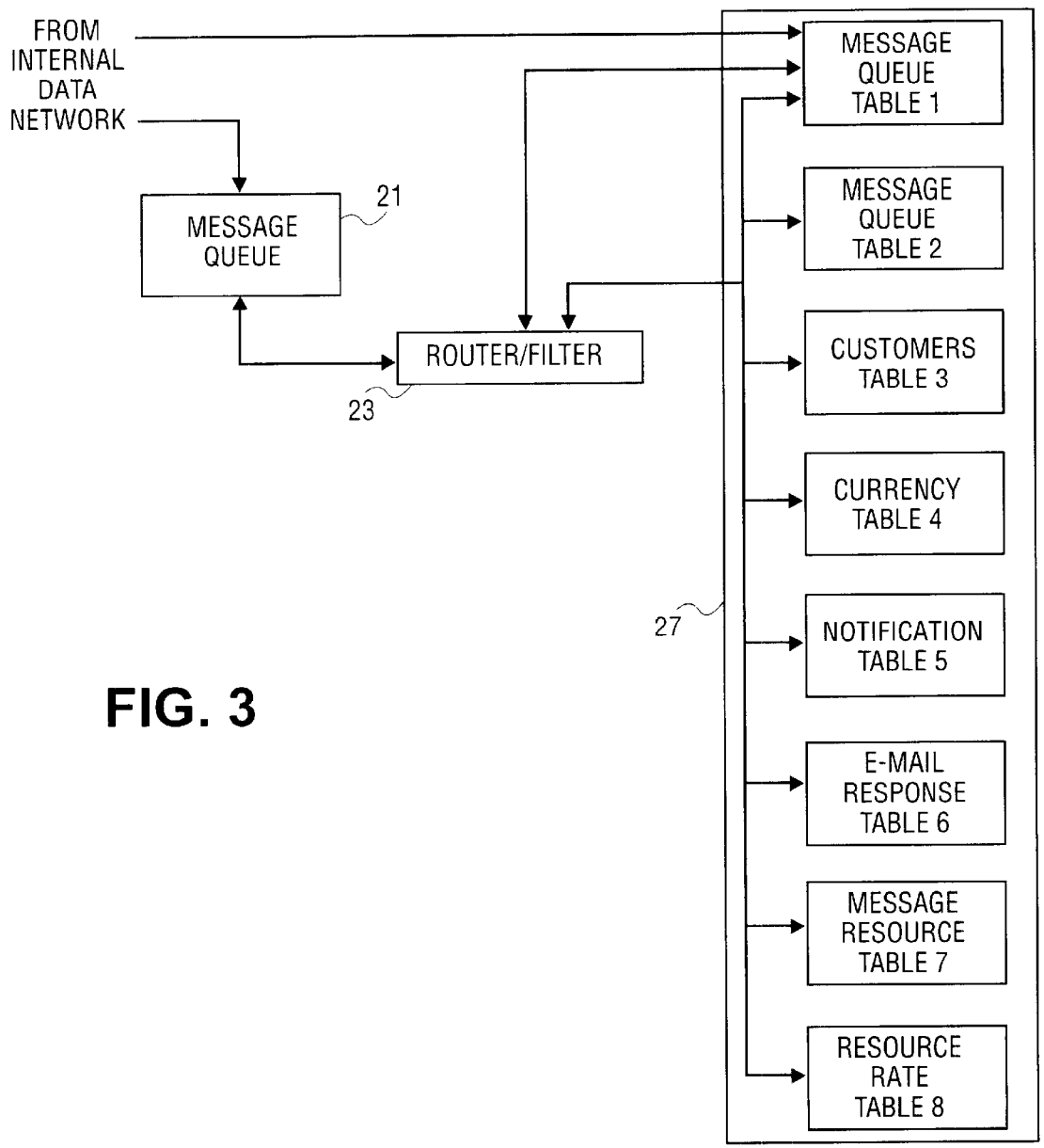
FIG. 3 is a block diagram showing the data/control flow through message queue 21, router/filter 23 and database 27.

FIG. 3 is a block diagram showing the data/control flow through message queue 21, router/filter 23 and database 27 using information contained in the following tables as explained with reference to FIGS. 4a and 4b.

TABLE 1

Message Queue Table

| | |
|---|---|
| MESSAGE_ID | This is a unique number assigned to each message that arrives in the system. |
| RESOURCE_ID | Unique number assigned to each Outbound Resource |
| RESOURCE_TYPE | Each Resource is identified by the type of messages it can deliver (e.g., FAX, VOICE, NOTIFY, etc.) |
| RESOURCE_ADDRESS | Location of the Resource (such as IP address) |
| MESSAGE_TO_EMAIL_ADDRESS | To: address of the message |
| MESSAGE_FROM_EMAIL_ADDRESS | From: address of the message |
| MESSAGE_LOCATION | Location of actual message on the Message Queue 21 |
| MESSAGE_SIZE | Size of the message in bytes |
| MESSAGE_PRIORITY | Priority of the message (e.g., low, medium, high) |
| MESSAGE_CREATION_DATE | Timestamp identifying the date/time that the message was received by the system |
| MESSAGE_EXPIRY_DURATION | Amount of time after which the message becomes stale |
| MESSAGE_SCHEDULED_DATE | Scheduled delivery timestamp for the message |
| MESSAGE_STATUS | Current status of the message (Active, Pending, Sent, etc.) |
| MESSAGE_ESTIMATED_COST | Estimated cost for the delivery of the message |
| CUSTOMER_KEY | Unique number identifying the customer in the database |
| MESSAGE_PART_OF_BROADCAST | Flag identifying if the message is part of a larger broadcast list waiting to be delivered |
| BROADCAST_ID | Unique number identifying a broadcast list |
| COVERPAGE_ID | Unique number identifying a coverpage (if any) for a fax |
| MESSAGE_SUBJECT | Subject line of the message to be delivered |
| MESSAGE_DURATION | Duration of the message (delivery time of fax, or delivery time for a voice message, etc.) |
| MESSAGE_RATE | Rate for message delivery (dollars per second, etc.) |
| MESSAGE_SEND_DATE | Actual timestamp identifying when the message was delivered |
| MESSAGE_REMOTE_CSID | Identifier of the fax machine to which a FAX message was delivered |
| MESSAGE_TYPE | Type of message (e.g., FAX, VOICE, NOTIFICATION, etc.) |
| RESOURCE_COMMUNICATION_TYPE | Protocol used to communicate with the resource (HTTP, SHTTP, etc.) |
| MESSAGE_LANGUAGE_CODE | Language used for delivery of a receipt or response, based on settings in the customer table |
| MESSAGE_PAGES | Number of pages of a message (used primarily for a fax) |

TABLE 2

File Type Table

| | |
|---|---|
| FILETYPE_MESSAGE_TYPE | Identifier of a message type (FAX, VOICE, etc.) |
| FILETYPE_RESOURCE_TYPE | Identifier to determine a resource that can handle a particular file type |
| FILETYPE_EXTENSION | The filename extension that identifies a file type (e.g., WAV, TIF, JFX, AU, GSM, etc.) |

TABLE 3

Customer Table

| | |
|---|---|
| CUSTOMER_KEY | Unique number identifying a customer in the database |
| FIRSTNAME | First name of customer |
| LASTNAME | Last name of customer |
| COMPANY | Company name of customer |
| ADDRESSLINE1 | Company address |
| ADDRESSLINE2 | Company address |
| CITY | Company city |
| MAILREGION | Company state or equivalent |
| MAILCODE | Zipcode or equivalent |
| COUNTRY | Company country |
| WORKNUMBER | Customer work phone number |
| HOMENUMBER | Customer home phone number |
| EMAILADDRESS | Email address of customer |
| COLLECTIONMETHOD | Collection method such as Credit card, Debit, etc. |
| BILLTYPE | e.g., Customer, Demo, free, corporate, etc. |

TABLE 3-continued

Customer Table

| | |
|---|---|
| STATUS | Status of customer, Active, Inactive, etc. |
| LANGUAGECODE | Language of customer, English, German, etc. |
| CURRENCYCODE | Currency for billing the customer, U.S. Dollars, Pound Sterling, etc. |

TABLE 4

Currency Table

| | |
|---|---|
| FORMAT | Currency label |
| CURRENCY_SYMBOL | Symbol for currency |

TABLE 5

Notification Table

| | |
|---|---|
| CUSTOMERKEY | Unique number identifying a customer in the database |
| PAGERTYPECODE | Code to determine the kind of pager service |
| BBSNUMBER | Modem number for pager notification delivery, based on the pager type |
| PAGERNUMBER | Identifier number of the pager unit |
| PIN | PIN code for the pager unit |
| DISPLAYTYPE | Display type of the pager (numeric, alphanumeric, etc.) |

TABLE 6

Response_email Table

| | |
|---|---|
| RESPONSE_ID | Unique ID for a response/receipt message to be sent to a customer |
| RESPONSE_SUBJECT | Subject line of the response message |
| RESPONSE_FROM_EMAIL | From: line of the response message |
| RESPONSE_BODY | Actual text of the response message |

TABLE 7

Resource Table

| | |
|---|---|
| RESOURCE_ID | Unique identifier for the resource |
| RESOURCE_TYPE | Type of resource (FAX, VOICE, etc.) |
| RESOURCE_STATUS | Status of resource (Active, Inactive, etc.) |
| RESOURCE_QUEUE_STATUS | Status of the Queue, number of messages in queue |
| RESOURCE_TIME_ZONE | Time zone for the resource |
| RESOURCE_QUEUE_MAX | Maximum size of the resource queue |
| RESOURCE_ADDRESS | Address of the resource (IP address, etc.) |
| RESOURCE_NAME | Name of the resource |
| RESOURCE_EXPIRY_DURATION | Expiry duration for any message sent to the specified resource |
| RESOURCE_QUEUE_IN_STATUS | Number of messages waiting to be delivered by the resource |
| RESOURCE_COMMUNICATION_TYPE | Method used to communicate with resource (HTTP, SHTTP, etc.) |

TABLE 8

Resource Rates Table

| | |
|---|---|
| RESOURCE_ID | Unique identifier for the resource |
| RESOURCE_PREFIX | Any digits to be dialed before an actual number |
| RESOURCE_CITY_NAME | Name of destination city for the message to be delivered |
| RESOURCE_PROVIDER_RATE | Rate for a particular city (dollars per second, etc.) |
| RESOURCE_MAX_DIGITS | Max number of digits allowed to be dialed |
| RESOURCE_AREA_CODE | Area code for the particular city |

Figure 4A:
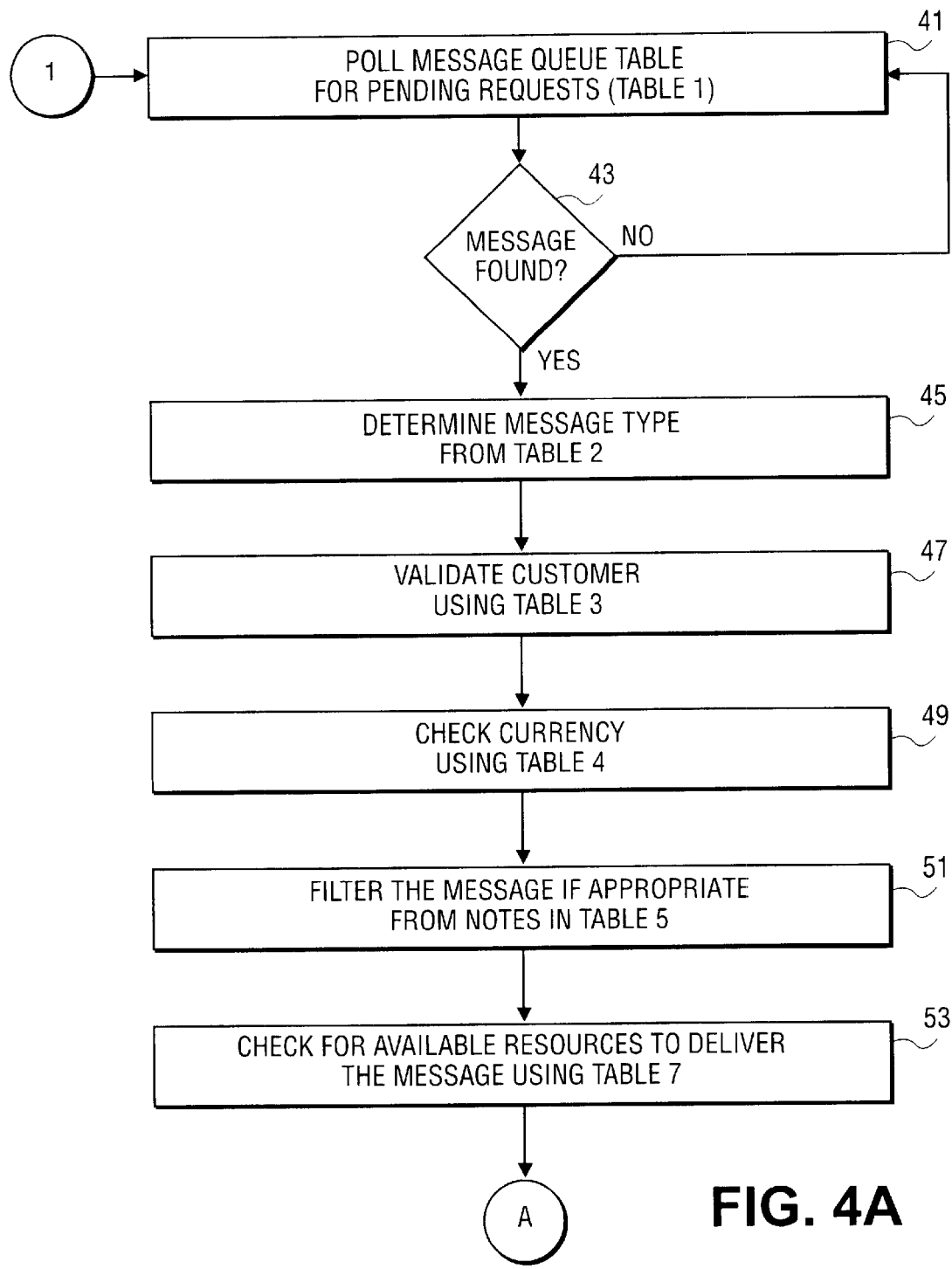
FIG. 4 (4a and 4b) is a flow diagram of the processing performed by router/filter 23.
Figure 4B:
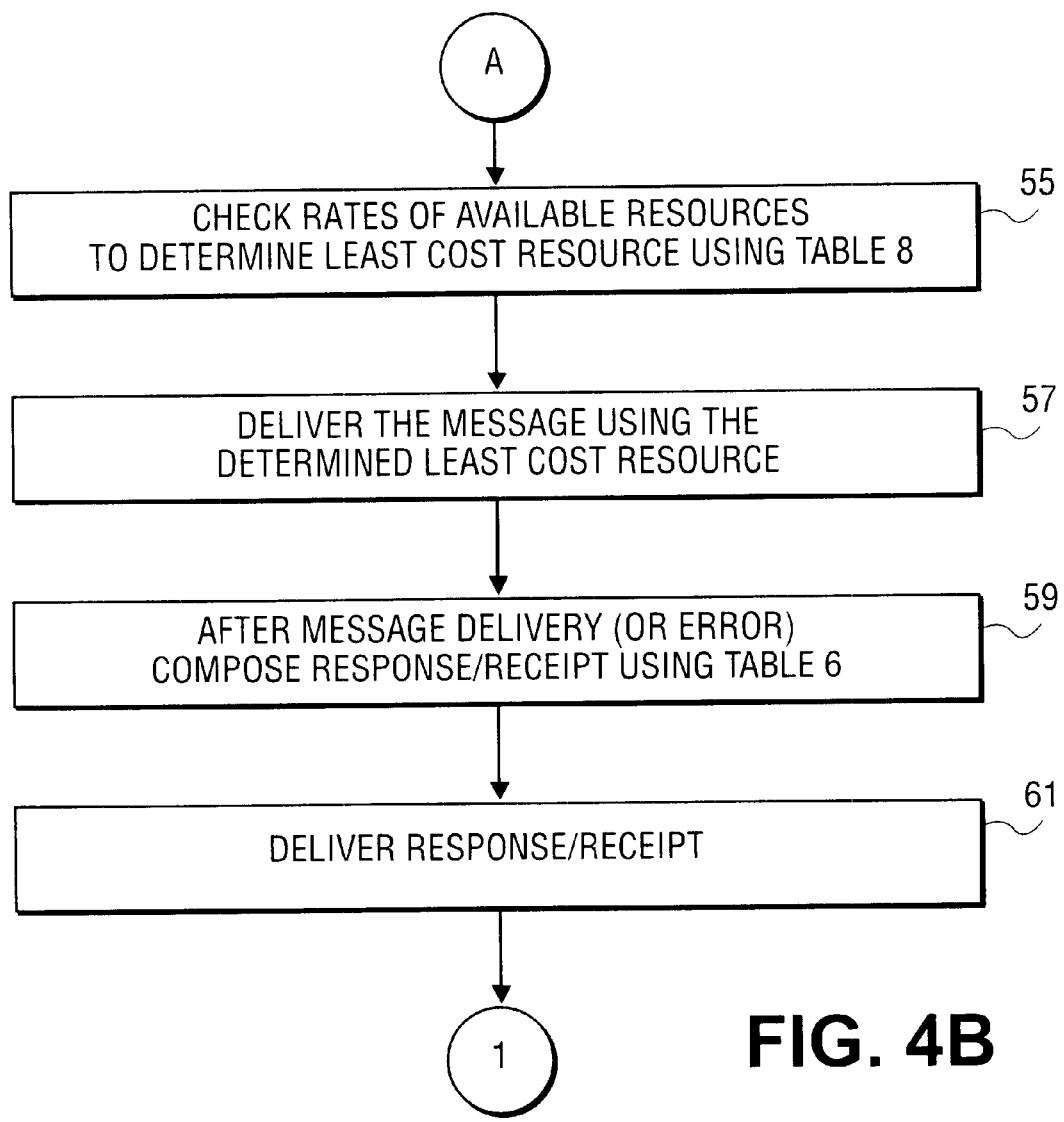

FIGS. 4a and 4b are a flow diagram of the processing performed by router/filter 23 using Tables 1–8. When a message is received it is placed into message queue 21 which is simply a storage area, the specifics of which, including the mechanism for placing the message into the queue are well known. Certain details concerning the message are also stored in a message queue table (Table 1). In step 41, router/filter, which is a computer program running on processing server 19, polls the message queue table for pending requests as determined by the existence of an active message in the message status field. If no message is found, after a system defined delay, the message queue table is again polled (step 43). Once a message has been found in the table, processing continues with step 45 by determining the message type using the message_type field in Table 1 and the file type information in Table 2. The customer is then validated using information in Table 3 in step 47. In step 49, currency information for the customer is obtained from Table 4. The message is then filtered for possible pager notification using the information in Table 5 in step 51. In step 53, Table 7 is used to check for available resources to deliver the message. In step 55, the rates of available resources are checked to determine the least cost resource using Table 8. Then in step 59, the message is delivered using the determined least cost resource. After the message has been delivered, or after an error in the delivery has occurred, in step 59, a response/receipt is composed using Table 6. In step 61, the response or receipt is delivered to the sender. The system then begins the process over again at step 41.

As noted above outbound resource 31 is equivalent to communications server 150 as described in U.S. Pat. No. 6,208,638. The modifications made to outbound resource to enable it to operate in a system having an architecture as described herein are as follows.

These changes will be described with reference to the message structure of received messages.

Message Structure

Each field has a value following an '=' sign and is terminated by a newline character. The exception to this is the "Message" field where a newline immediately follows the '=" sign and the actual message follows on the next line.

The fields of a message are as follows:

Password=
MessageID=
MessageStatus=
MessageSentTimeStamp=
MessageDuration=
MessageLength=
MessageRemoteCSID=
MessageSourceCSID=
MessageAttachStatus=
MessageDestination=
ResourceID=
ResourceStatus=
ResourceLastCommTimeStamp=
ResourceExpiryDuration=
ResourceQueueInStatus=
ResourceQueueOutStatus=
ResourceChannelMax=
ResourceChannelStatus=
MessageBoundary=
Message=

In the following explanation of the above fields, the text in brackets at the end indicates the entity providing the value for the field in the forward/reverse direction (i.e., from router/filter 23 (RF) to outbound resource 31 (RESOURCE), and from RESOURCE to RF, respectively). "NA" indicates that no value is applicable, and the text "NA" is used to populate the field. "Same" indicates that the same value is used in the reverse direction, i.e, the RESOURCE does not modify the value; it only echoes the value it receives in that field.

Password—There is a fixed password pair for each RESOURCE and RF combination. RESOURCE stores the RF password in a flat text password file in a directory (jfaxom), and RF stores the RESOURCE password in the database. (RF/RESOURCE).

MessageID—Unique ID, per message, generated by RESOURCE. (RESOURCE/Same).

MessageStatus—Code indicating current status of the message. See Status codes below. (RF/RESOURCE)

MessageSentTimeStamp—Time stamp indicating date/time the message was delivered to the final destination by RESOURCE. (NA/RESOURCE)

MessageDuration—Time (in seconds) to transmit message from RESOURCE. (NA/RESOURCE)

Messagelength—Number of pages transmitted by RESOURCE. (NA/RESOURCE)

MessageRemoteCSID—called subscriber identification (CSID) of fax machine to which message was transmitted. (NA/RESOURCE)

MessageSourceCSID—Source CSID. This may be customized per customer. (RF/Same)

MessageAttachStatus—Value of "A" indicates a message is attached for delivery. (RF/RESOURCE)

MessageDestination—Destination phone number. (RF/Same)

ResourceID—Unique ID, per resource, stored in the database. (RF/Same)

ResourceStatus—Code indicating the current status of the resource, i.e., whether it is active or not. RF uses this to determine whether further messages should be sent to RESOURCE for delivery. See Status codes below. (NA/RESOURCE)

ResourceLastCommTimeStamp—Date/time of last communication between RF and RESOURCE. (RF/RESOURCE)

ResourceExpiryDuration—Life of message (in minutes) on RESOURCE. If a message has not been delivered to the final destination by RESOURCE within this amount of time, the message is considered "expired" and is discarded.

ResourceQueueInStatus—Number of messages waiting to be processed in an Inbox directory on RESOURCE. (NA/RESOURCE)

ResourceQueueOutStatus—Number of messages waiting to be processed in an Outbox directory on RESOURCE. (NA/RESOURCE)

ResourceChannelMax—Number of channels available for use on RESOURCE. (NA/RESOURCE)

ResourceChannelStatus—Channel activity status, e.g., 0000000111000001, where 0's indicate an idle channel and 1's indicate a busy channel. (NA/RESOURCE)

MessageBoundary—Text for MIME boundary. (RF/NA)

Message—Actual MIME message sent by RF. If MessageAttachStatus=NA, no message follows this tag. All fields are NA if not used.

Date fields are expressed in MMDDYYhhmmss format.

Resource Status Codes are:

A—Active

I—Inactive

Message Status Codes are:

P—Pending

H—On Hold

D—Deferred

R—Ready for sending to RESOURCE

X—Exchanged, i.e., sent to RESOURCE but not acknowledged by it.

A—Sent to RESOURCE and acknowledged by it.

S—Sent (i.e., receipt for final delivery received from RESOURCE)

Normal sequence for Message delivery by RESOURCE is:

RF receives a request in its queue (message queue 21).

RF sends the message to RESOURCE.

RESOURCE gets message, authenticates password, and creates a new message in the Inbox directory.

RESOURCE acknowledges receipt of message.

RESOURCE processes the message in Inbox (MessageStatus=A, MessageAttachStatus=A).

RESOURCE moves message to a Process directory for further processing.

RESOURCE finishes processing message and delivers it to final destination.

RESOURCE removes the message from the Process directory.

RESOURCE creates a message in Outbox directory. (MessageStatus=S). If a "reply message" is to be delivered to the original sender, MessageAttachStatus=A, else MessageAttachStatus=NA. MessageID remains the same in either case.

RESOURCE delivers receipt (with "reply message," if applicable) to RF.

RF receives the message and puts it in the Queue for database processing.

Processing server 19 with the above described functionality may be implemented using readily available systems such as a Windows NT server or a UNIX server. Database 27 may be implemented as a database server using readily available systems such as a Windows NT server or a UNIX server running, for example a SQL database.

Figure 5:
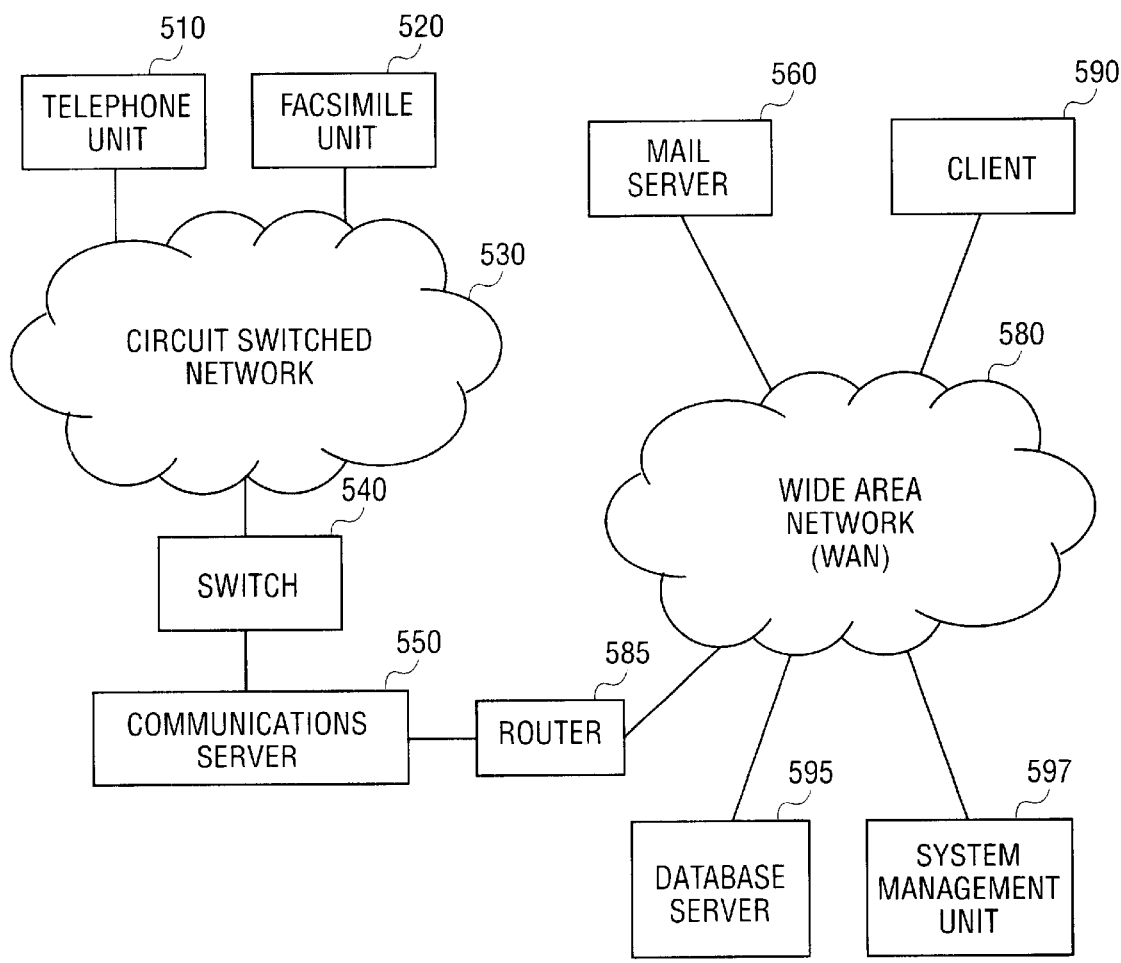
FIG. 5 is a system diagram of a network containing a message server.
Figure 6:
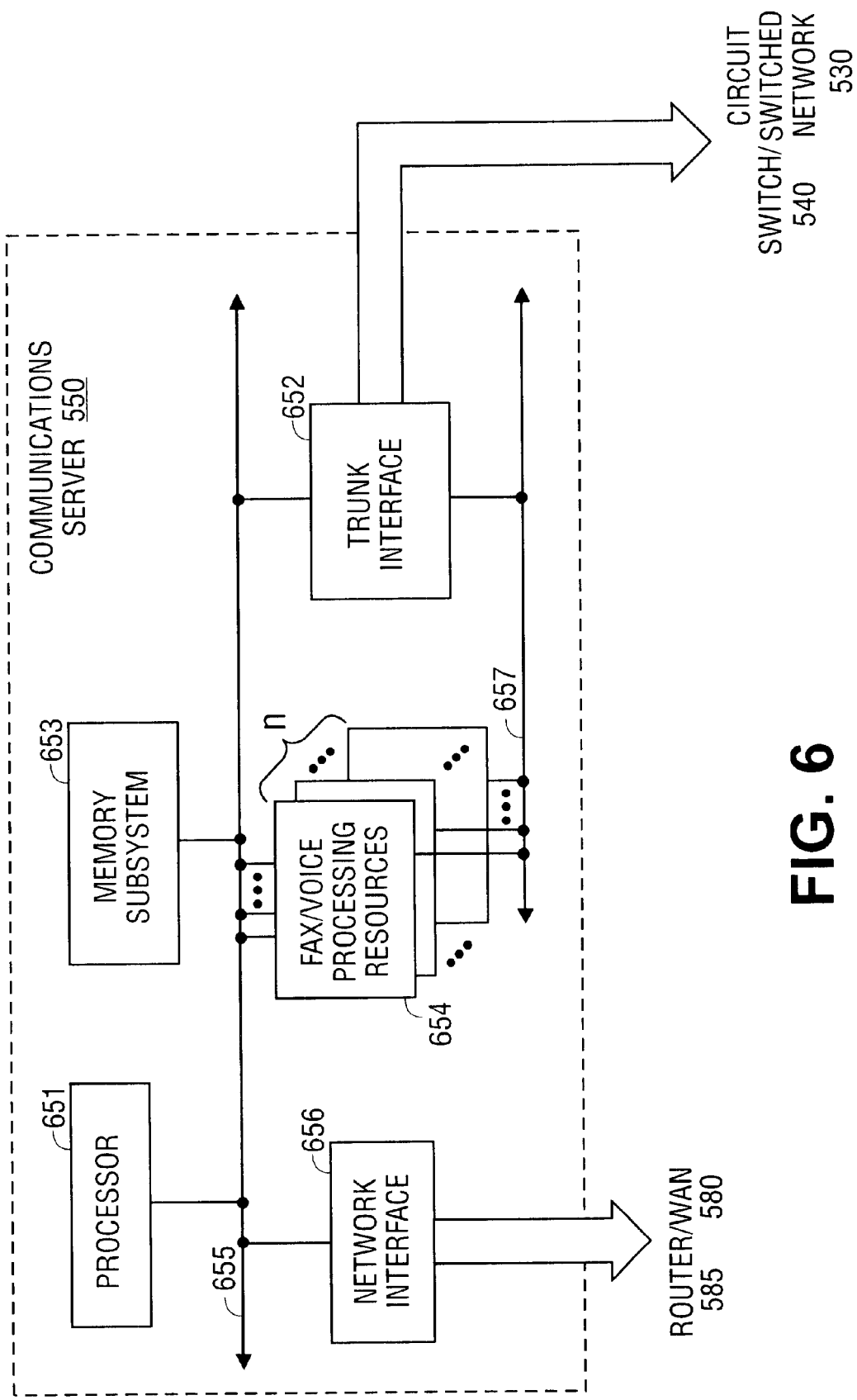
FIG. 6 is a block diagram illustrating the message server.
Figure 7:
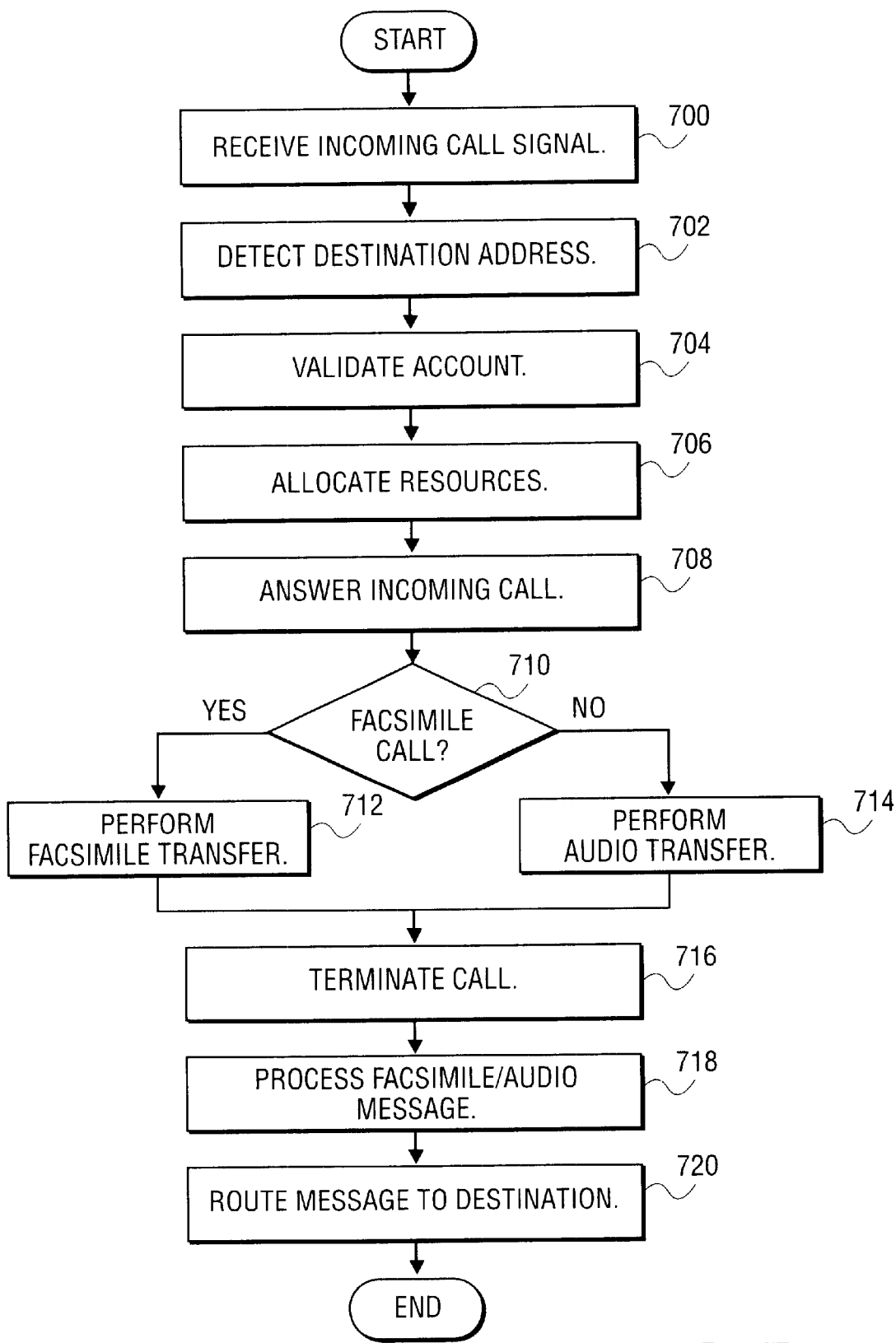
FIG. 7 is a flow diagram illustrating some operations.

What follows is a detailed description of FIGS. 5–7 which set forth a method and apparatus for allowing the receipt and transmission of audio and fax information between a circuit switched network and a packet switched network, as described in U.S. Pat. No. 6,208,638. For purposes of explanation, specific embodiments are set forth to provide a thorough understanding of the present invention. However, it will be understood by one skilled in the art, from reading this disclosure, that the invention may be practiced without these details. Further, although the system is described through the use of circuit switched and packet switched networks, most, if not all, aspects apply to all networks in general.

FIG. 5 contains a block diagram illustrating an embodiment of a system containing a communications server 550 connected to a circuit switched network 530 and a wide area network (WAN) 580. In an embodiment, the circuit switched network 530 is a circuit switched network such as the PSTN while WAN 580 is a packet switched network such as the Internet. It is to be noted that circuit switched network 530 can also be a network such as the generalized switched telephone network (GSTN), which encompasses PSTN networks, cellular telephone networks, and the other networks with which they are in communication.

Communications server 550 is connected to circuit switched network 530 via a switch 540 and to WAN 580 through the use of a router 585. As described in further detail below, in an embodiment, switch 540 and router 585 are interfaced to communications server 550 using two separate hardware interfaces. In an alternate embodiment, switch 540 and router 585 can be interfaced to communications server 550 through the use of one hardware unit.

Connected to circuit switched network 530 is both a telephone unit 510 and a facsimile unit 520. Telephone unit 510 is a standard telephone capable of converting audio signals into electrical signals suitable for transmission over circuit switched network 530. Similarly, facsimile unit 520 is a standard facsimile machine capable of transmitting and receiving facsimile messages over circuit switched network 530. Each of these devices can be connected to circuit switched network 530 using either wired or wireless technology.

Connected to WAN 580 is a database server 595, a system management unit 597, a mail server 560, and a client 590. Each of these systems communicate with each other and with communications server 550 via WAN 580 using such protocols such as simple network management protocol (SNMP) and hyper-text transport protocol (HTTP)—packetized using a protocol such as the transmission control protocol/internet protocol (TCP/IP).

In an embodiment, each one of database server 595, system management unit 597, mail server 560, and client 590, are stand-alone computers or workstations containing the hardware and software resources to enable operation. In alternate embodiments, the functions provided by each one of database server 595, system management unit 597, mail server 560, and client 590, are provided by any number of computer systems.

In an embodiment, mail server 560 is a server providing e-mail receipt and transmission using a protocol such as the simple mail transfer protocol (SMTP) and post office protocol (POP). Moreover, client 590 is configured to be able to communicate over WAN 580 using SMTP or POP in order to retrieve e-mail from mail server 560 or another suitably configured server.

System management unit 597 communicates with communications server 550 to monitor: (1) the processes on communications server 550; (2) the status of the trunk line connected to communications server 550; and (3) the connection between the various servers connected to WAN 580. As described below, if any processes on communications server 550 or connection to the circuit switched network 530 is interrupted, system management unit 597 can allocate resources, or cause the re-routing of a call or message via one or more redundant resources or connections, ensuring that the call or message is routed to the final destination.

Communications server 550 contains user data needed to receive and route incoming messages received from circuit switched network 530. The same information is also stored on database server 595. In an embodiment, communications server 550 stores an inbound address, a set of final destination addresses; and an account status for each user. The inbound address corresponds to the telephone number assigned to the user. As further discussed below, the inbound address is the number that a message sender dials on telephone unit 510 or facsimile unit 520 to leave a message for the user. The set of final destination address contain one or more e-mail addresses where the user account status information indicates whether the inbound address is either active and or inactive—i.e, whether the user is able to receive messages using the system.

Database server 595 stores a duplicate copy of the inbound address, the set of final destination addresses; and the account status for each user. Database server 595 also stores additional information for each user such as mailing address and billing information which are not used in the operation of the present invention but are note herein for completeness only. Thus, the information that is stored on communications server 550 is a subset of the information that is stored on database server 595, and if communications server 550 were to become inoperable or otherwise unable to handle incoming messages, database server 595 can configure another communications server to accept those calls.

In an embodiment, system management unit 597 is responsible for monitoring the status of communications server 550 and re-assigning the users being handled by communications server 550 if communications server malfunctions or becomes overloaded with incoming calls. In the former case, system management unit 597 would re-assign all users being handled by communications server 550 to another communications server. In the latter case, system management unit 597 would only off-load the only those incoming calls for which communications server 550 does not have the available resources to process.

FIG. 6 is a block diagram of communications server 550 configured in accordance with an embodiment containing a processor 651 coupled to a memory subsystem 653 through the use of a system bus 655. Also coupled to system bus 655 is a network interface 656; a trunk interface 652; and a set of fax/voice processing resources 654. Set of fax/voice processing resources 654 and trunk interface 652 are also coupled to a bus 657.

Bus 657 is a bus that supports time division multiplex access (TDMA) protocols to optimize the flow of real time traffic between set of fax/voice processing resources 654 and trunk interface 652.

Memory subsystem 653 is used to store information and programs needed by communications server 550. The functioning of memory subsystems in computer design are well known to those of ordinary skill in the art and thus will not be further discussed herein.

In an embodiment, trunk interface 652 is a trunk line interface, such as a T-1 or E-1 line, to switch 540 and can handle up to 24 channels of communications. Trunk line signaling is well known to those of ordinary skill in the art of telecommunication and thus will not be further discussed herein except as necessary for describing the invention.

Set of fax/voice processing resources 654 are made up of multiple fax/voice processing cards. Each of these processing cards contain processing units which are capable of receiving and transmitting facsimiles according to established protocols, and which are capable of digitizing voice or other audio data, also according to established protocols. In an embodiment, there are three fax/voice processing cards in set of fax/voice processing resources 654, each fax/voice processing card containing eight processing units capable of handling a channel from trunk interface 652. Thus, communications server 550 can communicate on twenty-four channels concurrently.

The storage of destination addresses on both circuit switched network 530 and WAN 580 is controlled by a database located either on communications server 550 or on database server 595. Keeping this information separate from communications server 550 allows communications server 550 to be a resource that can be allocated on demand. Hence, a number of communications servers could be used, along with one or more database servers, to allow a fully redundant and scalable system. In addition, system management unit 597 monitors the status and connection of all the communication and database servers.

FIG. 7 is a flow diagram illustrating the operations of an embodiment of the present invention when a call originating from a source on the circuit switched network 530. For example, either telephone unit 510 or facsimile unit 520 can initiate the call.

In block 700, an incoming call signal is received by communications server 550 from switch 540. The incoming call signal is initiated by telephone unit 510 or facsimile unit 520 over circuit switched network 530 and is routed to communications server 550 via switch 540. Communications server 550 detects the incoming call signal using trunk interface 652. Operation would continue with block 702.

Continuing with block 702, trunk line interface unit 652, in addition to receiving signals to indicate that there is an incoming call from switch 540, also receives signals indicating the circuit destination address of the incoming call. The destination address is captured by trunk interface 652 and is determined by trunk line signaling using mechanisms such as direct-inward-dial, or dual tone multifrequency (DTMF) tones.

Continuing with block 704, to determine whether or not to process the incoming call, processor 651 searches the list of inbound addresses contained in memory subsystem 653 for the destination address. If processor 651 finds the destination address in the inbound address list, processor 651 will then look up the account status for the user who owns the inbound address to determine if the account of that user is a valid user account. In an alternate embodiment, the validation is performed through the use of a database maintained by a separate entity such as database server 595. If the account is found to be inactive, communications server 651 will play a prepared message indicating that the number to which the incoming message was sent is an invalid account.

In block 706, once the validity of the user account has been established, processor 651 will attempt to allocate one fax/voice processing resource from set of fax/voice processing resources 654 and also determine the availability of other resources required for the receipt and processing of the incoming call. These other resources include the processing capacity of processor 651, the storage capacity of memory subsystem 653.

If it is determined that the appropriate resources are not available, then the call will be routed to a different communications server that is capable of allocating the necessary resources. The routing of calls is accomplished by trunk line signaling via switch 540 and is managed by system management unit 597.

Also, it should be noted that the call will only come from switch 540 to communications server 550 if there are no problems with the line. Otherwise the call will get routed to a different communications server. In an embodiment, fault detection and correction happens in one of two ways. First, on the telephone network side, switch 540 can be set up to independently route a call to another line if it is determined that one of the lines is bad. Second, if communications server 550 detects that the trunk line coming into trunk interface 652 is down, communications server 550 will notify system management unit 597 to reallocate the users for whom communications server 550 is responsible onto another communications server. Thus, system management unit 597 will transfer the duplicate user information contained in database server 595 into a different communications server.

In block 708, communications server 550 "answers" the incoming call by having trunk interface 652 go "off-hook" on the trunk line.

In block 710, if the fax/voice processing resource of set of fax/voice processing resources 654 which is processing the call determines that the incoming call is a fax transmission, then operation will continue with block 712. Otherwise, operation will continue with block 714. For example, if the call is a fax, a fax protocol is initiated, and the fax is received by one of the fax/voice processing resources of set of fax/voice processing resources 654. If the call is a voice call, the voice is recorded by one of the fax/voice processing resources of set of fax/voice processing resources 654.

In block 712, the fax/voice processing resource of set fax/voice processing resources 654 responsible for processing the incoming call will perform the fax transfer and store the incoming message as a temporary file in memory subsystem 653. In an embodiment, the incoming fax is saved into a file which follows the group 3 facsimile file format. Operation will then continue with block 716.

In block 714, where it is determined that the incoming message is an audio message, the fax/voice processing resource of set of fax/voice processing resources 654 allocated to process the call will initiate an audio recording of the incoming voice message. In an embodiment, the audio message is digitized and stored in memory subsystem 653 as a temporary file in a pulse code modulated format. After the incoming call has been digitized and stored, operation will then continue with block 716.

In block 716, trunk interface 652 will terminate the call. Operation will then continue with block 718.

In block 718, the incoming message, which has been stored as a temporary file in memory subsystem 653, is processed by processor 651. In an embodiment, the temporary file is processed according to the type of the incoming call. If the incoming call was a fax transmission, then the temporary file, which has been stored as a group 3 facsimile file, will be converted into a file which follows the tagged image file format (TIFF), or a format that is suitable for transmission over WAN 580. Optionally, the temporary fax file can also be compressed at this stage. If the incoming call was an audio message, then the temporary file would be compressed using a compression scheme such as the scheme defined in the global system for mobile-communications (GSM) standard. In alternate operations, compressing and other processing of the incoming message is performed as the same time the incoming message is being received and being placed in memory subsystem 653.

In block 720, communications server 550 uses the inbound address to determine the set of final destination addresses, which are destinations on WAN 580 (i.e., the packet switched network), to send the processed incoming message. Communications server 550 then sends an electronic mail (e-mail) with the processed incoming message as an attachment to all the destinations in the set of final destination addresses.

For example, the e-mail containing the attachment is transferred to, and stored in, a server such as mail server 560, The e-mail is then retrieved by client 590 whenever the user wishes. In an alternate embodiment, client 590 can retrieve the e-mail directly from communications server 550, without the storing operation of mail server 560.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A system for supporting a message delivery service, comprising:

a plurality of processing servers each being coupled to communicate with a plurality of first outbound resources and a database server, over an internal packet-switched data network, the database server containing account information on customers of the message delivery service, each processing server implements a router-filter and a message queue, the message queue to store request messages that are received from a customer of the message delivery service over an external packet-switched data network, the router-filter to obtain a request message from the queue while polling the queue for pending requests, validate a customer associated with said request message after accessing the account information in the database server, and determine to which of the plurality of first outbound resources to assign said request message, each of the first resources being capable of converting an input request message into a format capable of being received by a fax machine over a telephone network.

2. The system of claim 1 wherein the internal data network is a private data network.

3. The system of claim 2 wherein the external data network is the Internet.

4. The system of claim 3 wherein the request messages are received from the customers via one of a mail transport protocol server and a hypertext transport protocol server on the Internet.

5. The system of claim 1 wherein the router-filter is to prioritize a plurality of request messages that have been obtained from the queue and that are assigned to an outbound resource.

6. The system of claim 1 wherein the router-filter is to determine which of the plurality of first outbound resources to assign said request message to, based on which resource offers the least cost of delivering said request message.

7. The system of claim 1 wherein the router-filter is to generate an error message that indicates an error in delivering said request message as reported by the outbound resource to which said request message was assigned.

8. The system of claim 1 further comprising:
a plurality of second outbound resources each being capable of converting an input request message into a format capable of being played back to a telephone over a telephone network, wherein the router-filter is to determine to which of the first and second resources said request message is to be assigned, based on a message type of said request matching a capability of one of a first resource and a second resource.

9. The system of claim 1 further comprising:
a plurality of second outbound resources each being capable of converting an input request message into a format capable of being transmitted to a paging terminal over one of (1) a telephone network and (2) a paging gateway over an external packet-switched network, wherein the route-filter is to determine to which of the first and second resources said request message is to be assigned, based on a message type of said request matching a capability of one of a first resource and second resource.

10. An article of manufacture for supporting a message delivery system, comprising:
a machine accessible medium containing data that, when accessed by a machine, cause a plurality of processing servers to communicate with a plurality of first outbound resources and a database server all as part of an internal packet-switched data network, each processing server implements a router-filter and a message queue, the message queue to store request messages that are received from a customer of the message delivery service over an external packet switched data network, the router-filter to obtain a request message from the queue, validate a customer associated with said request message after accessing account information in the database server, and determine which of the plurality of first outbound resources to assign said request message, each of the first resources being capable of converting an input request message into a format capable of being received by a fax machine over a telephone network.

11. The article of manufacture of claim 10 wherein the medium includes further data which, when executed by the machine, cause the internal network to perform as a private data network.

12. The article of manufacture of claim 10 wherein the medium includes further data which allow the request messages to be received from a customer over the Internet.

13. The article of manufacture of claim 12 wherein the medium includes further data which allow the request messages to be received from the customer via one of a mail transport protocol server and a hypertext transport protocol server on the Internet.

14. The article of manufacture of claim 10 wherein the medium includes further data which, when executed by the machine, cause the router-filter to prioritize a plurality of request messages that have been obtained from the queue and that are assigned to an outbound resource.

15. The article of manufacture of claim 10 wherein the medium includes further data which, when executed by the machine, cause the router-filter to determine which of the plurality of first outbound resources to assign said request message to, based on which resource offers the least cost of delivering said request message.

16. The article of manufacture of claim 10 wherein the medium includes further data which, when executed by the machine, cause the router-filter to generate an error message that indicates an error in delivering said request message as reported by the outbound resource to which said request message was assigned.

17. The article of manufacture of claim 10 wherein the medium includes further data which, when executed by the machine, cause one of the plurality of processing servers to be capable of (1) communicating with a plurality of second outbound resources each being capable of converting an input request message into a format capable of being played back to a telephone over the telephone network and (2) determining which of the first and second outbound resources to assign said request message based on a message type of said request message matching the capability of an outbound resource.

18. The article of manufacture of claim 10, wherein the medium includes further data which, when executed by the machine, cause one of the plurality of processing servers to be capable of (1) communicating with a plurality of second outbound resources each being capable of converting an input request message into a format capable of being transmitted to one of (1) a paging terminal over a telephone network and (2) a paging gateway over an external packet-switched network, and (2) determining which of the first and second outbound resources to assign said request message based on a message type of said request message matching the capability of an outbound resource.

19. A method for supporting a message delivery service, comprising:
communicating with a plurality of first outbound resources and a data base server over an internal packet-switched data network, each of the plurality of first outbound resources being capable of converting a request message into a format capable of being received by a fax machine over a telephone network, the database server containing account information on customers of the message delivery service;
obtaining a request message from a message queue, the queue storing a plurality of request messages that are received from customers of the message delivery service and that were sent from an external packet-switched data network;
validating a customer associated with said obtained request message after accessing the account information in the database server; and
determining to which of the plurality of first outbound resources said obtained request message should be assigned.

20. The method of claim 19 wherein the internal data network is a private data network.

21. The method of claim 19 wherein the external data network is the Internet.

22. The method of claim 21 wherein the request messages are received from the customers via one of a mail transport protocol server and a hypertext transport protocol server on the Internet.

23. The method of claim 19 further comprising:

prioritizing the delivery of a plurality of request messages that have been obtained from the queue and that are assigned to an outbound resource.

24. The method of claim 19 further comprising:

determining which of the plurality of first outbound resources to assign said obtained request message to, based on which resource offers the least cost of delivering said obtained request message.

25. The method of claim 19 further comprising:

generating an error message that indicates an error in delivering said obtained request message as reported by the outbound resource to which said obtained request message was assigned.

26. The method of claim 19 further comprising communicating with a plurality of second outbound resources each being capable of converting a request message into a format being capable of being played back to a telephone over a telephone network; and determining to which of the plurality of first and second outbound resources said obtained message should be assigned, based on a message type of said request message matching a capability of an outbound resource.

27. The method of claim 19, further comprising:

communicating with a plurality of second outbound resources each being capable of converting an input request message into a format capable of being transmitted to one of (1) a paging terminal over a telephone network and (2) a paging gateway over an external packet-switched network; and determining to which of the plurality of first and second outbound resources said obtained message should be assigned, based on a message type of said request message matching a capability of an outbound resource.

* * * * *

(12) EX PARTE REEXAMINATION CERTIFICATE (6151st)
United States Patent
Narasimhan et al.

(10) Number: US 6,597,688 C1
(45) Certificate Issued: Mar. 11, 2008

(54) SCALABLE ARCHITECTURE FOR TRANSMISSION OF MESSAGES OVER A NETWORK

(75) Inventors: Anand Narasimhan, Beverly Hills, CA (US); Yaacov Shemesh, Los Angeles, CA (US); Amit Kumar, Los Angeles, CA (US)

(73) Assignee: J2 Global Communications, Inc., Hollywood, CA (US)

Reexamination Request:
No. 90/007,472, Mar. 21, 2005

Reexamination Certificate for:
Patent No.: 6,597,688
Issued: Jul. 22, 2003
Appl. No.: 09/097,307
Filed: Jun. 12, 1998

(51) Int. Cl.
*H04L 12/64* (2006.01)

(52) U.S. Cl. .................. 370/353; 370/465; 370/355; 370/356; 379/220.01

(58) Field of Classification Search .................. None
See application file for complete search history.

(56) References Cited

U.S. PATENT DOCUMENTS

| | | | |
|---|---|---|---|
| 4,941,170 | A | 7/1990 | Herbst |
| 5,113,496 | A | 5/1992 | McCalley et al. |
| 5,193,110 | A | 3/1993 | Jones et al. |
| 5,299,255 | A | 3/1994 | Iwaki et al. |
| 5,333,266 | A | 7/1994 | Boaz et al. |
| 5,339,156 | A | 8/1994 | Ishii |
| 5,406,557 | A | 4/1995 | Baudoin |
| 5,479,411 | A | 12/1995 | Klein |
| 5,487,100 | A | 1/1996 | Kane |
| 5,513,126 | A | 4/1996 | Harkins |
| 5,557,659 | A | 9/1996 | Hyde-Thomson |
| 5,561,703 | A | 10/1996 | Arledge et al. |
| 5,568,536 | A | 10/1996 | Tiller et al. |
| 5,568,540 | A | 10/1996 | Greco et al. |
| 5,579,472 | A | 11/1996 | Keyworth, II et al. |

(Continued)

FOREIGN PATENT DOCUMENTS

| | | |
|---|---|---|
| EP | 0554456 A1 | 8/1993 |
| EP | 0835021 A1 | 4/1998 |
| JP | 09-135266 | 5/1947 |
| JP | 04-256273 | 9/1992 |
| JP | 04-290033 | 10/1992 |

(Continued)

OTHER PUBLICATIONS

*j2 Global Communications, Inc. v. Venali, Inc.*, United States District Court Central District of California, Case No. CV04-01172 DDP (AJWx), litigation cover page.

(Continued)

*Primary Examiner*—Roland G. Foster

(57) ABSTRACT

A system for supporting a message delivery service, a method for supporting such a service and a machine accessible medium containing program data for implementing such a system. A number of processing servers are coupled to communicate with a number of outbound resources and a database server over an internal packet-switched data network. The database server contains account information on customers of the service. Request messages received from a customer over an external packet-switched data network are stored in a queue of a processing server. A router filter obtains a request message from the queue and validates a customer associated with the request message, after accessing the database server. A determination is made as to which of the multiple outbound resources to assign the request message. Each of these resources is capable of converting an input request message into a format capable of being received by a fax machine over a telephone network.

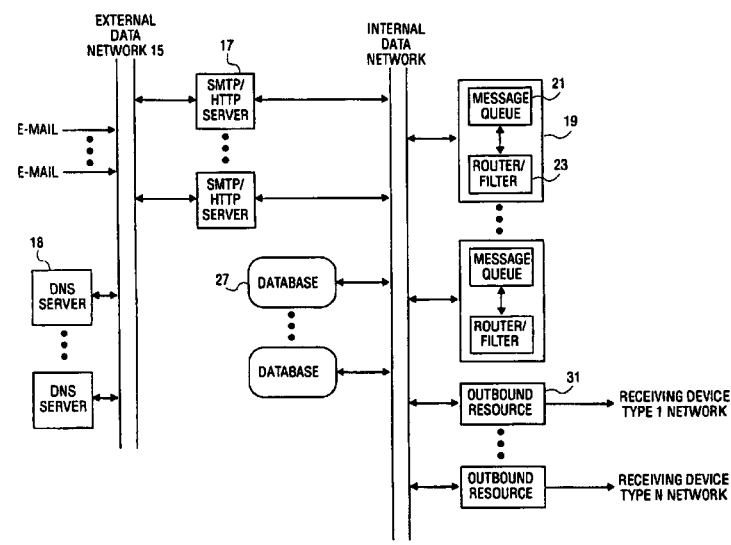

U.S. PATENT DOCUMENTS

| | | |
|---|---|---|
| 5,604,788 A | 2/1997 | Tett |
| 5,608,786 A | 3/1997 | Gordon |
| 5,621,727 A | 4/1997 | Vaudreuil |
| 5,630,060 A | 5/1997 | Tang et al. |
| 5,633,916 A | 5/1997 | Goldhagen et al. |
| 5,675,507 A | 10/1997 | Bobo, II |
| 5,712,907 A | 1/1998 | Wegner et al. |
| 5,717,742 A | 2/1998 | Hyde-Thomson |
| 5,737,395 A | 4/1998 | Irribarren |
| 5,740,231 A | 4/1998 | Cohn et al. |
| 5,742,668 A | 4/1998 | Pepe et al. |
| 5,742,905 A | 4/1998 | Pepe et al. |
| 5,751,791 A | 5/1998 | Chen et al. |
| 5,758,088 A | 5/1998 | Bezaire et al. |
| 5,761,201 A | 6/1998 | Vaudreuil |
| 5,761,396 A | 6/1998 | Austin et al. |
| 5,765,033 A | 6/1998 | Miloslavsky |
| 5,774,668 A | 6/1998 | Choquier et al. |
| 5,781,614 A | 7/1998 | Brunson |
| 5,870,454 A | 2/1999 | Dahlen |
| 5,872,845 A | 2/1999 | Feder |
| 5,933,412 A | 8/1999 | Choudhury et al. |
| 5,933,490 A | 8/1999 | White et al. |
| 5,937,161 A | 8/1999 | Mulligan et al. |
| 5,940,476 A | 8/1999 | Morganstein et al. |
| 5,987,508 A | 11/1999 | Agraharam et al. |
| 5,991,292 A | 11/1999 | Focsaneanu et al. |
| 5,999,525 A | 12/1999 | Krishnaswamy et al. |
| 5,999,594 A | 12/1999 | Mizoguchi et al. |
| 6,020,980 A | 2/2000 | Freeman |
| 6,023,345 A | 2/2000 | Bloomfield |
| 6,025,931 A | 2/2000 | Bloomfield |
| 6,028,679 A | 2/2000 | Murphy |
| 6,052,442 A | 4/2000 | Cooper et al. |
| 6,064,723 A | 5/2000 | Cohn et al. |
| 6,069,890 A | 5/2000 | White et al. |
| 6,072,862 A | 6/2000 | Srinivasan |
| 6,073,165 A * | 6/2000 | Narasimhan et al. ....... 709/206 |
| 6,084,892 A | 7/2000 | Benash et al. |
| 6,084,952 A | 7/2000 | Beerman, Jr. et al. |
| 6,185,603 B1 | 2/2001 | Henderson et al. |
| 6,208,638 B1 * | 3/2001 | Rieley et al. ............... 370/354 |
| 6,212,550 B1 | 4/2001 | Segur |
| 6,215,550 B1 | 4/2001 | Baer et al. |
| 6,215,858 B1 | 4/2001 | Bartholomew et al. |
| 6,216,173 B1 | 4/2001 | Jones et al. |
| 6,233,318 B1 | 5/2001 | Picard et al. |
| 6,246,983 B1 | 6/2001 | Zou et al. |
| 6,259,533 B1 | 7/2001 | Toyoda et al. |
| 6,263,064 B1 | 7/2001 | O'Neal et al. |
| 6,285,777 B2 | 9/2001 | Kanevsky et al. |
| 6,301,245 B1 | 10/2001 | Luzeski et al. |
| 6,301,339 B1 | 10/2001 | Staples et al. |
| 6,304,636 B1 | 10/2001 | Goldberg et al. |
| 6,330,079 B1 | 12/2001 | Dugan et al. |
| 6,339,591 B1 | 1/2002 | Migimatsu |
| 6,341,160 B2 | 1/2002 | Tverskoy et al. |
| 6,350,066 B1 | 2/2002 | Bobo, II |
| 6,356,356 B1 | 3/2002 | Miller, Jr. et al. |
| 6,359,881 B1 | 3/2002 | Gerszberg et al. |
| 6,360,256 B1 | 3/2002 | Lim |
| 6,411,696 B1 | 6/2002 | Iverson et al. |
| 6,564,321 B2 | 5/2003 | Bobo, II |

FOREIGN PATENT DOCUMENTS

| | | |
|---|---|---|
| JP | 04-291858 | 10/1992 |
| JP | 05-233488 | 9/1993 |
| JP | 05-235997 | 9/1993 |
| JP | 05-284326 | 10/1993 |
| JP | 05-316309 | 11/1993 |
| JP | 06-069956 | 3/1994 |
| JP | 06-217069 | 8/1994 |
| JP | 07-038689 | 2/1995 |
| JP | 07-212393 | 8/1995 |
| JP | 07-250094 | 9/1995 |
| JP | 08-009092 | 1/1996 |
| JP | 09-023273 | 1/1997 |
| WO | WO 97/23082 A1 | 6/1997 |
| WO | WO 98/017041 A2 | 4/1998 |
| WO | WO 98/23058 A2 | 5/1998 |

OTHER PUBLICATIONS

Guo Zhen Sheng, et al., "Intranet–Based Mail Fax Gateway Technology", 1997 IEEE International Conference on Intelligent Processing Systems, Oct. 28–31, Beijing, China, 97TH8335 vol. 2 of 2, pp. 1607–1611.

L. Orozco–Barbosa, et al. "Design and Performance Evaluation of Intelligent Multimedia Services", Computer Communications 20 (1997) pp. 219–232.

Guide to Intelligent Least Cost Routing, Right Fax, Inc. (1997).

Guide to Internet Faxing, Right Fax, Inc. (1997).

Rightfax Ships Internet Connectivity Module for Lan Fax Software; Rightfax News Release; (Feb. 10, 1997).

Rightfax Poised for Internet Faxing; Rightfax News Release (May 27, 1997).

Mendel, Brett; Net Faxing Awaits Its Day; Lan Times, Dec. 9, 1996, v13 n27, p. 25(2).

Kinnucan, Paul; What's New in the Fax World; Systems Integration; Feb. 1990, v23 n2 p. 50(7).

Deixler, Lyle; Fax Forges Ahead; Teleconnect; Nov. 1996, v14 n11 p. 52(12).

Fax Solutions; Lan Times Sep. 23, 1996, v13 n21 p. 123(5).

Rightfax Introduces New Fax Server Designed for the Enterprise; Rightfax News Release (May 27, 1997).

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–27 is confirmed.

* * * * *